United States Patent [19]

Futamura

[11] Patent Number: 5,262,050
[45] Date of Patent: Nov. 16, 1993

[54] HOLLOW FIBER MEMBRANE MODULE

[75] Inventor: Osamu Futamura, Kanagawa, Japan

[73] Assignee: Ebara Corporation, Tokyo, Japan

[21] Appl. No.: 916,744

[22] Filed: Jul. 22, 1992

[30] Foreign Application Priority Data

Jul. 24, 1991 [JP] Japan .................. 3-206104

[51] Int. Cl.$^5$ .............................. E01D 63/02
[52] U.S. Cl. .................. 210/321.8; 210/321.89; 210/500.23
[58] Field of Search .......... 210/321.6, 321.78, 321.79, 210/321.8, 321.88, 321.89, 321.87, 321.81, 321.9, 500.23

[56] References Cited

FOREIGN PATENT DOCUMENTS 2-13067  4/1990  Japan .
2-13069  4/1990  Japan .

*Primary Examiner*—Frank Sever
*Attorney, Agent, or Firm*—Wenderoth, Lind & Ponack

[57] ABSTRACT

A hollow fiber membrane module adapted to be immersed in water to provide filtered water has hollow fibers bundled in a U shape and a securing part that secures the free end portion of the hollow fiber bundle such that the free end portion communicates with a water collecting part provided adjacent to the securing part. A support member is provided inside the U-shaped end portion of the hollow fiber bundle and supports and engages the hollow fibers such that each hollow fiber has a relatively wide U-shaped end portion and the hollow fibers are dispersed over the support member. A spacer is provided near the securing part and retains the hollow fibers such that the hollow fibers extend outward of the axis of the securing part and such that longitudinally extending portions of each hollow fiber are spaced apart from each other. Thus, suspended matter entering the bundle of the hollow fibers can be easily removed by washing and there is no possibility of the hollow fibers adhering together.

27 Claims, 4 Drawing Sheets

HOLLOW FIBER MEMBRANE MODULE

BACKGROUND OF THE INVENTION

1. Field of the Invention

The present invention relates to a hollow fiber membrane module for filtering a liquid. More particularly, the present invention relates to a hollow fiber membrane module which is suitable for use in a solid-liquid separating process for obtaining a pure liquid from a suspension.

2. Prior Art

Hollow fiber (also called "hollow fiber membrane") has an excellent filtering ability and by virtue of its structure presents a large surface area as required for filtration. Therefore, it has heretofore been widely employed for various uses, for example, production of industrial water of high purity, filtration of a gas, etc. In addition, a method has heretofore been practiced wherein a hollow fiber membrane module is immersed in water to be treated, which has a suspended matter concentration in the range of from several thousands [mg/L] to ten thousands [mg/L], to directly obtain filtered water therefrom.

The hollow fiber membrane module has generally been produced as follows. To facilitate production, a multiplicity of hollow fibers are bundled at at least one end thereof and are secured in a securing part, and a water collecting part is provided adjacent to the securing part. Further, it has been conventional practice to form a hollow fiber membrane module by using a bundle of hollow fibers which are arranged in a U shape because the number of hollow fibers needed is halved if bundled in such a configuration. In this type of hollow fiber membrane module, the hollow fibers are in close contact with each other because they are tied in the securing part provided at one end thereof.

If a liquid to be treated which has a high concentration of suspended matter, e.g., a suspension in a biological treatment tank, is filtered by using the above-described hollow fiber membrane module, the suspended matter enters the spaces between the multiplicity of hollow fibers and remains there, so that no suspension can pass thereby. Accordingly, it is likely that a group of hollow fibers will become stuck to each other as a result of suspended matter attached thereto. In such a case, it is difficult for raw water to enter and contact the inside fibers of the bundle, so that the available filtration area decreases, resulting in a lowering in the filtering function. Further, in the hollow fiber membrane module that employs a U-shaped hollow fiber bundle, the U-shaped end portion of each hollow fiber, which is provided opposite to the free end portion of the hollow fiber that is secured in the securing part, can usually move freely. Therefore, each hollow fiber moves freely in the current of a liquid, so that the hollow fibers are likely to become tangled with each other and form a cluster.

To overcome these disadvantages, Japanese Utility Model Post-Exam Publication No. 2-13067 proposes a unit wherein a hollow fiber support member having a ring-shaped configuration, for example, is disposed to engage the U-shaped end portions of hollow fibers arranged in a bundle so that the hollow fibers are prevented from moving freely.

The proposed unit suffers, however, from the following problems. Since the unit is designed so that the hollow fiber membrane module is disposed in a straight pipe of the unit, the size of the hollow fiber support member, on which the hollow fibers are supported, is restricted by the size of the straight pipe and hence, the support member is configured so that it can be accommodated in the straight pipe. That is, the diameter of the support member is almost the same as that of the securing part of the membrane module. For this reason, the hollow fiber support member only functions to disperse the hollow fibers in a parallel arrangement. However, even with this unit, clustering of the hollow fibers in the hollow fiber bundle is not substantially obviated, and it is impossible to enlarge a spacing between adjacent hollow fibers. Accordingly, the suspended matter entering the space between the hollow fibers is likely to stay there, causing the hollow fibers to adhere to each other. Thus, the above-described problems remain unsolved.

The clustering of the hollow fibers in the hollow fiber bundle may be prevented, for example, by increasing the diameter of the ring-shaped hollow fiber support member. By such means, it is possible to provide a slight increase in the spacing between the U-shaped end portions of the hollow fibers of the U-shaped hollow fiber bundle. However, longitudinally extending portions of each U-shaped hollow fiber engaged with the ring-shaped hollow fiber support member are still positioned close to each other. In addition, there is no improvement in preventing the clustering of the hollow fibers near the securing part, to which the free end portion of the bundle is attached.

SUMMARY OF THE INVENTION

It is, therefore, an object of the present invention to provide a hollow fiber membrane module having hollow fibers bundled in a U shape, which is designed so that the U-shaped hollow fibers are sufficiently spaced apart from each other at their U-shaped ends and so that longitudinally extending portions of each U-shaped hollow fiber are also satisfactorily spaced apart from each other over substantially the entire length thereof, i.e., from the U-shaped end to the vicinity of the securing part.

It is another object of the present invention to provide a hollow fiber membrane module which is designed so that longitudinally extending portions of each U-shaped hollow fiber, of a bundle of hollow fibers arranged in a U shape, are satisfactorily spaced apart from each other, thereby preventing suspended matter which enters the space between the hollow fibers from staying there and enabling the suspended matter to be readily removed to the outside of the module upon washing attended by the blowing of the fibers with an air stream, and thus permitting the module to be used effectively for a long period of time without the hollow fibers adhering to each other.

To attain the above-described objects, the present invention provides a hollow fiber membrane module adapted to be immersed in water to provide filtered water and having hollow fibers bundled in a U shape and a securing part that secures a free end portion of the hollow fiber bundle such that the free end portion, communicates with a water collecting part provided adjacent to the securing part, wherein the module comprises: a support member provided inside the U-shaped end portion of the hollow fiber bundle and having a first supporting portion and a second supporting portion spaced from the first supporting portion, the support member supporting and engaging the hollow fibers such that each hollow fiber forms a relatively wide U-shaped portion and the hollow fibers are dispersed over the support member; and a spacer provided near the securing part to retain the hollow fibers such that the hollow fibers extend outward of the axis of the securing part longitudinally extending portions of each hollow fiber are spaced apart from each other.

The objects of the present invention are attained effectively by employing, as the support member and the spacer, members having a closed curved outer configuration, such as circular or elliptical rings.

More specifically, in the present invention a support member, also serving as a spacer, is provided inside the U-shaped end portions of bundled hollow fibers to support them in such a way that longitudinally extending portions of each U-shaped hollow fiber are spaced apart from each other and also the hollow fibers are dispersed over the support member. Further, a spacer is provided near the securing part and inside the hollow fiber bundle to retain the hollow fibers such that longitudinally extending portions of each U-shaped hollow fiber are spaced apart from each other. By virtue of the described structure of the present invention, the hollow fibers are retained in a dispersed pattern, and there is therefore no possibility of the hollow fibers becoming clustered. Thus, even if a suspension of high concentration is filtered, there is little likelihood that the suspended matter will attach to the hollow fibers, and any suspended matter attached thereto can be washed off easily.

As the support member in the present invention, any kind of support member can be employed, provided that it has a structure capable of supporting the hollow fibers in the above-described condition. However, it is preferable to employ a support member which is easy to produce and which can be passed through the inside of the U-shaped hollow fibers. For example, a support member comprising two concentric rings or an annular plate-like support member may be employed. It is also possible to employ a straight belt-shaped support member. In this case, however, it needs to be provided with fiber shift preventing projections to prevent the hollow fibers from gathering together in one place. The configuration of the support member is preferably circular, with a view to uniformly disperse the hollow fibers. At the support member, each hollow fiber extending from the securing part is supported in a U shape such that it is first bent at a first supporting portion of the support member and is then bent at a second supporting portion, which is spaced a certain distance from the first supporting portion, before returning to the securing part. Thus, longitudinally extending portions, that is, outgoing and return portions, of each hollow fiber are satisfactorily spaced apart from each other.

The spacer, which is provided near the securing part of the hollow fiber membrane module, is preferably disposed as close to the securing part as possible. Since the hollow fibers are concentrated near the securing part, the spacer retains the hollow fibers outward of the axis of the module to prevent a group of hollow fibers from adhering together in a stick-like form and to cause longitudinally extending portions of each U-shaped hollow fiber to be satisfactorily spaced apart from each other. For this purpose, the configuration of the spacer is preferably similar to that of the support member. When the support member comprises two concentric rings, the spacer preferably comprises two concentric rings or an outer ring and an inner concentric disk. In a case where the support member is a straight belt-shaped member, the spacer is also a straight belt-shaped member.

When the support member has a ring-shaped configuration, its diameter is preferably about 1 to 1.8 times the diameter of the spacer, and the distance between the first and second supporting portions of the support member, that is, the spacing width of the support member is preferably about 30 to 50 mm.

The spacer, which is provided near the securing part of the hollow fiber membrane module, is preferably disposed at a position whose distance from the securing part is about 1/5 to 1/10 of the length of the hollow fibers. When the spacer is circular, its outer diameter may be smaller than the outer diameter of the circular support member and is preferably about 1 to 2 times the outer diameter of the securing part. Further, it is also preferable for the width of the spacer to be smaller than the spacing width of the support member. However, the width of the spacer must be sufficiently large to provide a spacing adequate for washing between a pair of longitudinally extending portions of each U-shaped hollow fiber. The outer diameter and the width of the spacer may be determined experimentally.

Hollow fibers employed to form the hollow fiber membrane module are preferably those which have flexibility and resistance to chemicals and any external force applied thereto. Examples of such hollow fibers are those which are made of polyolefin, fluorinated polyolefin, polysulfone, polyacrylonitrile, etc., and which have ultrafilter or precision membrane properties.

In the hollow fiber membrane module of the present invention, hollow fibers bundled in a U shape are supported and dispersed at their U-shaped end portions by the support member, and longitudinally extending portions of each U-shaped hollow fiber are satisfactorily spaced apart from each other over substantially the entire length by both the support member and the spacer. Accordingly, it is easy for a liquid to flow through the space between the hollow fibers, so that there is no possibility of suspended matter which enters the space between the hollow fibers staying there, and the suspended matter can be washed away easily. It is therefore possible to prevent adhesion of the suspended matter to the hollow fibers and hence, to prevent the hollow fibers from adhering to each other. As a result, it is possible to prevent a group of hollow fibers from adhering together in a stick-like form. Thus, filtration can be continued for a long period of time.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

The present invention will be described below by way of embodiments. However, it should be noted that the present invention is not limited to these embodiments.

EMBODIMENT 1

Figure 1:
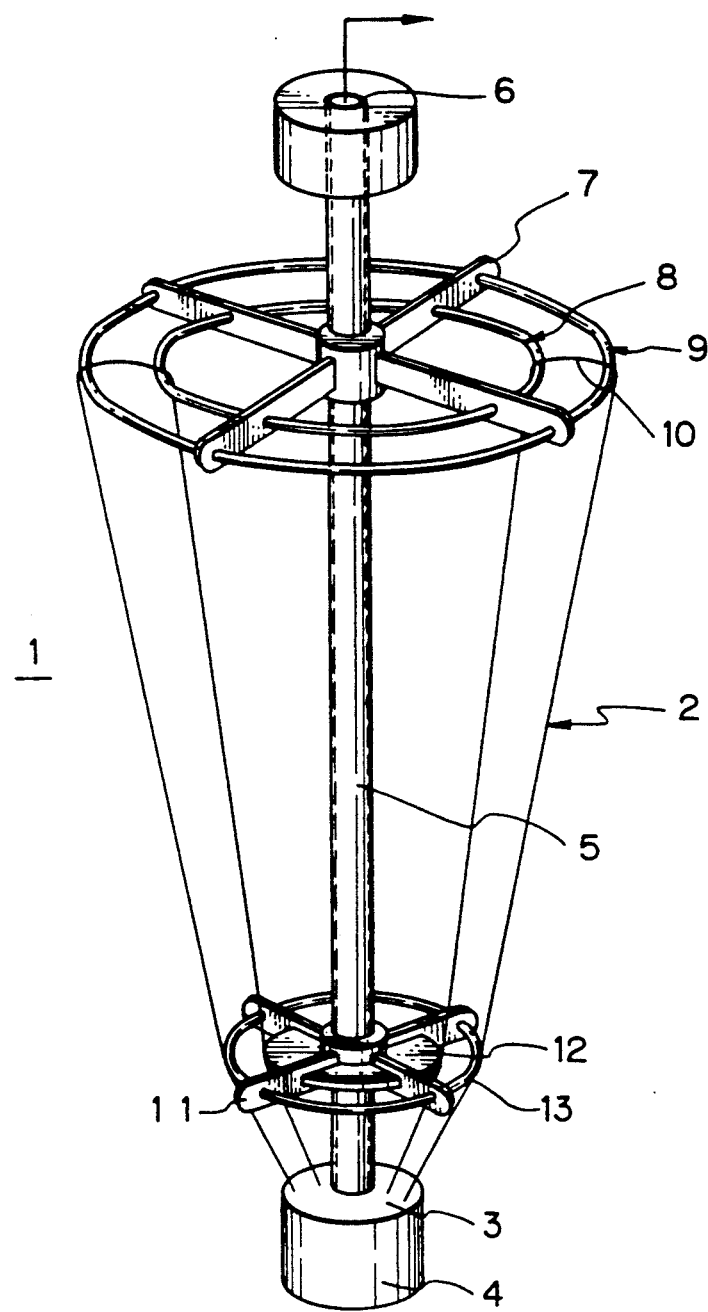
FIG. 1 is a perspective view of one embodiment of a hollow fiber membrane module according to the present invention.

The hollow fiber membrane module of this embodiment is formed by using two concentric rings as a support member and similarly using two concentric rings as a spacer disposed near the securing part. FIG. 1 is a perspective view of the hollow fiber membrane module 1 of this embodiment.

Referring to FIG. 1, the lower end or free end of a bundle of a multiplicity of U-shaped hollow fibers 2 is secured in a securing part 3, and a water collecting part 4 is provided under the securing part 3. An upwardly extending water collecting pipe 5 is provided in the center of the securing part 3. The water collecting pipe 5 has a filtered water outlet 6 provided at the upper end thereof. Support arms 7 are installed on the upper part of the water collecting pipe 5 to support a pair of inner and outer support members 8 and 9, which are concentric. The two support members 8 and 9 are disposed inside the U-shaped hollow fibers 2 to support the U-shaped end portions 10 of the hollow fibers 2. In one example of design, the diameter of the securing part 3 is 9 cm, whereas the diameters of the inner and outer support members 8 and 9 are 22 cm and 30 cm, respectively. The two support members 8 and 9 also function as spacers for the hollow fibers 2. Although only two U-shaped hollow fibers 2 are shown in FIG. 1, a large number of hollow fibers are supported by the two support members 8 and 9, being uniformly dispersed.

Further, support arms 11 are provided on the water collecting pipe 5 near the securing part 3 to support a pair of inner and outer spacers 12 and 13, which are concentric rings. In one example of design, the diameters of the inner and outer spacers 12 and 13 are 12 cm and 17 cm, respectively. A pair of longitudinally extending portions of each hollow fiber 2 are disposed outside the respective spacers 12 and 13, whereby the hollow fibers 2 extend as far outward of the hollow fiber membrane module 1 as possible and whereby longitudinally extending portions of each hollow fiber 2 are spaced apart from each other. In consideration of the strength of the hollow fibers 2, it is necessary to take care that no tension acts on the hollow fibers 2, exclusive of their own weight.

In the hollow fiber membrane module 1 of this embodiment, the securing part 3, the spacers 12 and 13, and the support members 8 and 9 are designed to be larger in size in the above-mentioned order, so that a stream of water coming from below the module 1 contacts the hollow fibers 2 effectively, thus enabling washing effectiveness to be enhanced.

Figure 2:
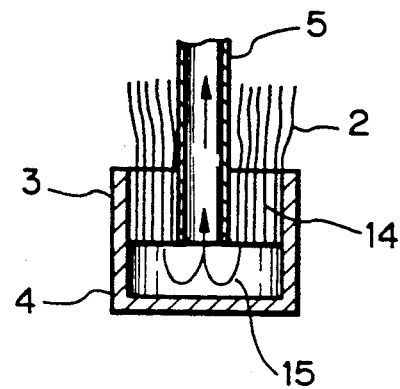
FIG. 2 is a vertical sectional view of a water collecting part of the hollow fiber membrane module shown in FIG. 1.

FIG. 2 is a vertical sectional view of the water collecting part 4 of the hollow fiber membrane module 1. The free ends of the hollow fibers 2 are secured by a securing member 14 in the securing part 3. Filtered water 15, which has passed through the hollow fibers 2, is collected in the water collecting part 4 and rises through the water collecting pipe 5.

Figure 3:
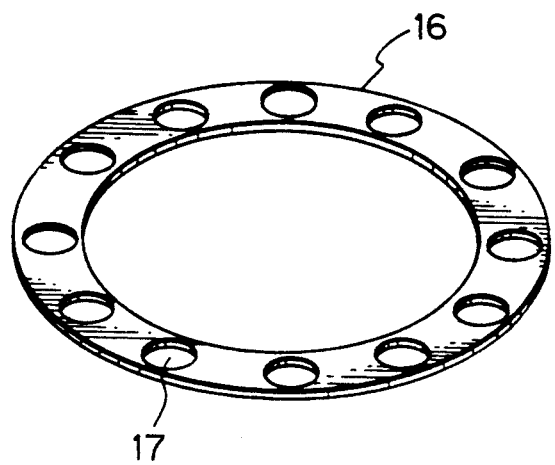
FIG. 3 is a perspective view of an annular support member which may be used in the hollow fiber membrane module shown in FIG. 1.

Although in this embodiment the inner and outer support members 8 and 9 that comprise two concentric rings are used as a support member, a single relatively wide annular plate such as that shown in FIG. 3 may be used as a support member 16 in place of the support members 8 and 9. In this case, the support member 16 also functions as a spacer. The support member 16 is preferably formed with a plurality of holes 17 for facilitating the passage of the stream of water therethrough.

Figure 4:
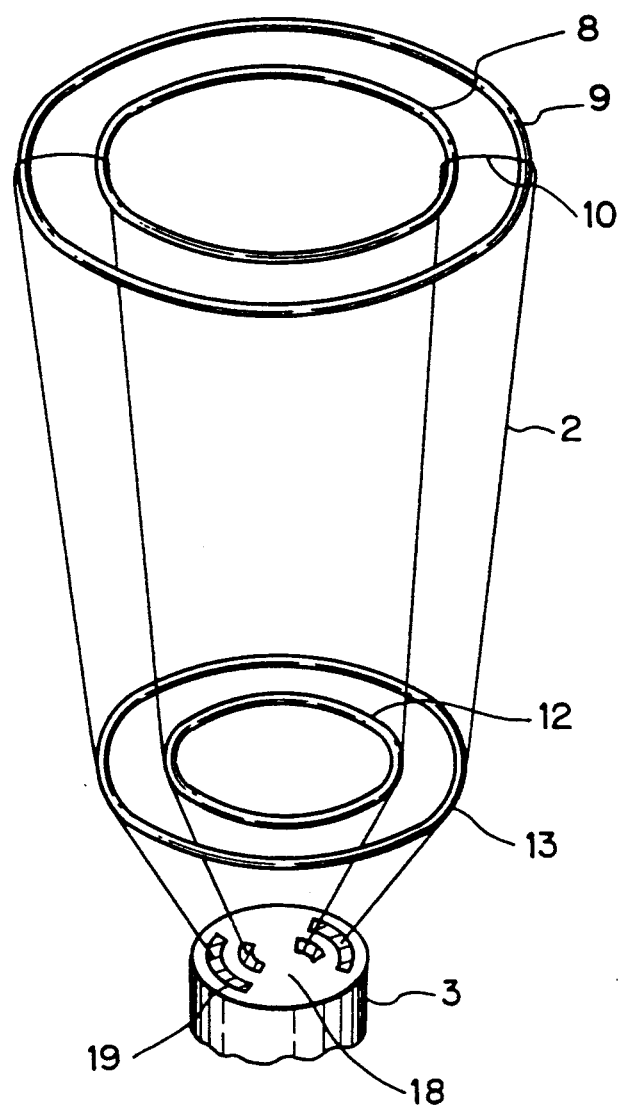
FIG. 4 is a schematic view showing the way in which the free end portions of U-shaped hollow fibers are distributed at a securing part of the hollow fiber membrane module shown in FIG. 1, and also showing the way in which the U-shaped hollow fibers are supported by support members and spacers.

Further, in the hollow fiber membrane module 1 shown in FIG. 1, it is preferable to secure the free end portions of the hollow fibers 2 in the securing part 3 such that the end portions of the hollow fibers 2 are distributed concentrically. However, the free end portions of the hollow fibers 2 may also be secured in such a manner as to be distributed in the form of concentric arcs, i.e., a part of circle. FIG. 4 is a schematic view showing the way in which the end portions of the U-shaped hollow fibers 2 are secured in the securing part 3 in such a manner as to be distributed in the form of arcs, and also showing the way in which the hollow fibers 2 are supported by the support members 8 and 9 and the spacers 12 and 13. The end portions 19 of the hollow fibers 2 are secured in bundles in the form of arcs at the upper face 18 of the securing part 3.

EMBODIMENT 2

Figure 5:
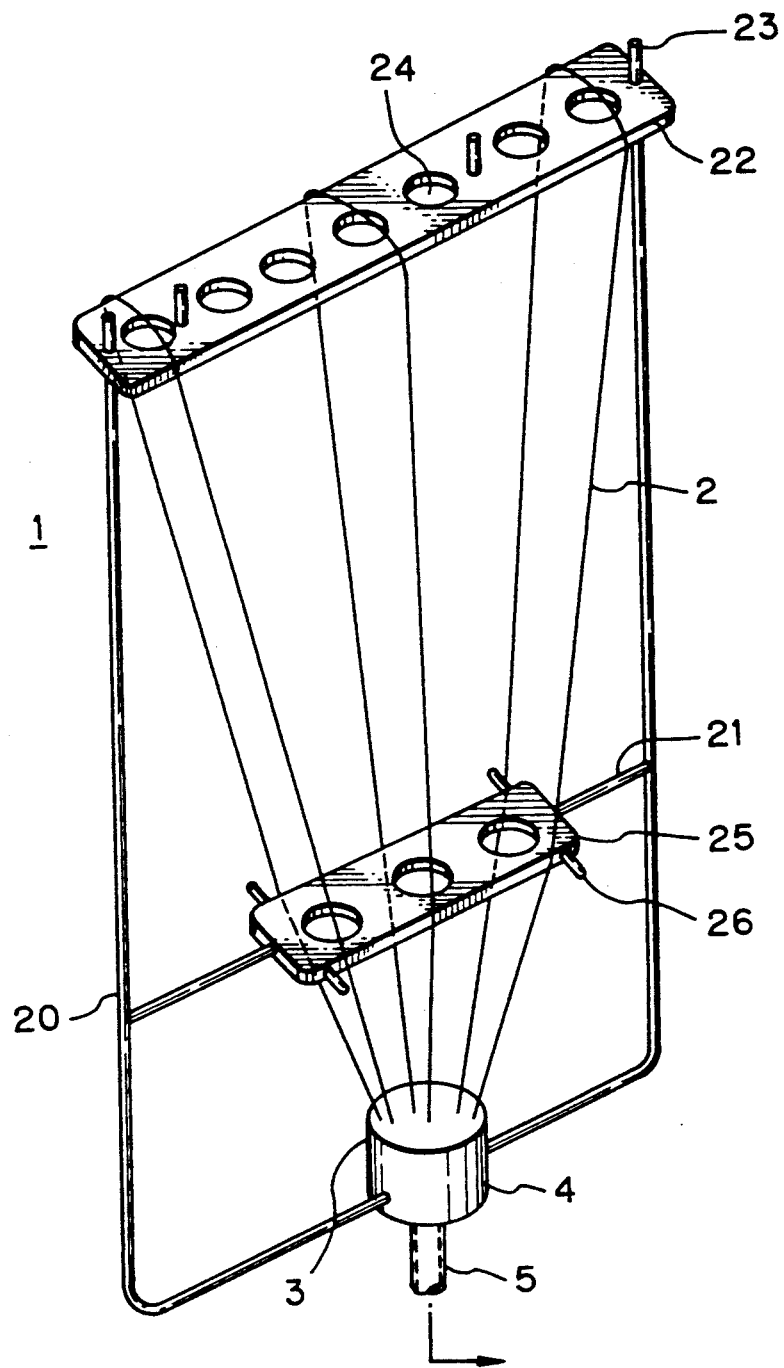
FIG. 5 is a perspective view of another embodiment of a hollow fiber membrane module according to the present invention.

The hollow fiber membrane module of this embodiment is formed by using straight belt-shaped members as both a support member and a spacer. FIG. 5 is a perspective view of the hollow fiber membrane module of this embodiment.

Referring to FIG. 5, the lower end or free end of a bundle of a multiplicity of U-shaped hollow fibers 2 is secured in a securing part 3, and a water collecting part 4 is provided under the securing part 3. A water collecting pipe 5 is provided under the water collecting part 4 to discharge filtered water therethrough. A belt-shaped support member 22 is retained by support posts 20 that are connected to the securing part 3. The U-shaped hollow fibers 2 are stretched astride the support member 22 and are thus retained by it. A plurality of fiber shift preventing projections 23 are provided on the surface of the support member 22 so that the hollow fibers 2 remain uniformly distributed over the support member 22.

A spacer 25, which comprises a belt-shaped member similar to the support member 22, is retained at a position near the securing part 3 by the support posts 20 and a support bar 21. The spacer 25 is interposed between a pair of longitudinally extending portions of each U-shaped hollow fiber 2, thereby spacing these longitudinally extending portions apart from each other. The width of the spacer 25 is smaller than that of the support member 22. A plurality of fiber shift preventing projections 26 are provided on the sides of the spacer 25 so that the hollow fibers 2 are retained along the sides of the spacer 25.

Since the support member 22 has a relatively large width, the hollow fibers 2 form relatively wide U-shaped end portions, and the support member 22 cooperates with the spacer 25 such that longitudinally extending portions of each hollow fiber 2 are spaced apart from each other over the entire length of the module 1. The support member 22 and the spacer 25 are preferably provided with holes 24 for facilitating the passing of water therethrough.

With the hollow fiber membrane module of the present invention, longitudinally extending portions of each U-shaped hollow fiber can be spaced apart from each other over substantially the entire length of the module, and all the hollow fibers are supported as dispersed. Accordingly, a clustering of the hollow fibers can be prevented and it is unlikely that the suspended matter entering the space between the hollow fibers will stay there. Since such suspended matter can be easily removed after washing by blowing an air stream against the fibers, there is no possibility of suspended matter adhering to the hollow fibers or of the hollow fibers becoming stuck to each other due to the adherence of suspended matter. Accordingly, it is possible to obtain a satisfactory filtering operation for a long period of time.

What is claimed is:

1. A hollow fiber membrane module comprising: a bundle of hollow fibers each having a U shape including a U-shaped end portion and longitudinally extending portions extending from the U-shaped end portion; a securing part that secures a free end portion of the bundle of hollow fibers; a water collecting part provided adjacent to said securing part and communicating with said free end portion of the bundle of hollow fibers; a support member provided inside the U-shaped end portion of each of said hollow fibers and having a first supporting portion and a second supporting portion spaced from said first supporting portion, each of the supporting portions of said support member supporting and engaging each of said hollow fibers such that the U-shaped end portion of each of said fibers has a width corresponding to the distance between said supporting portions, and said hollow fibers being dispersed over said support member; and a spacer provided near said securing part, said spacer retaining said hollow fibers at a location radially outward of said securing part and spacing the longitudinally extending portions of each of said hollow fibers apart from each other by a distance sufficient to substantially prevent interfiber clogging.

2. A hollow fiber membrane module claimed in claim 1, wherein said support member and said spacer respectively have a closed curve outer configuration.

3. A hollow fiber membrane module claimed in claim 2, wherein said support member and said spacer respectively comprise circular or elliptical rings.

4. A hollow fiber membrane module claimed in claim 3, wherein said support member and said spacer respectively comprise a pair of concentrically disposed support rings.

5. A hollow fiber membrane module claimed in claim 4, wherein an outer diameter of said spacer is smaller than that of said support member.

6. A hollow fiber membrane module claimed in claim 5, wherein the diameter of said support member is about 1 to 1.8 times of that of said spacer.

7. A hollow fiber membrane module claimed in claim 4, wherein the distance between said support rings is smaller than the distance between said support rings of said support member.

8. A hollow fiber membrane module claimed in claim 7, wherein the distance between said first and second supporting portions of said support member is about 30 to 50 mm.

9. A hollow fiber membrane module claimed in claim 4, further comprising a water collecting pipe extending upwardly from said water collecting part, and support arms supporting said support rings on said water collecting pipe.

10. A hollow fiber membrane module claimed in claim 2 wherein said support member comprises an annular plate formed with a plurality of circumferentially spaced holes.

11. A hollow fiber membrane module claimed in claim 2, wherein said support member comprises a pair of concentrically disposed support rings and said spacer comprises a concentrically disposed inner disc and outer support ring.

12. A hollow fiber membrane module claimed in claim 11, wherein an outer diameter of said spacer is smaller than that of said support member.

13. A hollow fiber membrane module claimed in claim 12, wherein the diameter of said support member is about 1 to 1.8 times of that of said spacer.

14. A hollow fiber membrane module claimed in claim 11, wherein the distance between said support ring and said disc of said spacer is smaller than the distance between said support rings of said support member.

15. A hollow fiber membrane module claimed in claim 14, wherein the distance between said first and second supporting portions of said support member is about 30 to 50 mm.

16. A hollow fiber membrane module claimed in claim 11, further comprising a water collecting pipe extending upwardly from said water collecting part, and support arms supporting said support rings and said disc on said water collecting pipe.

17. A hollow fiber membrane module claimed in claim 5, wherein the outer diameter of said spacer is about 1 to 2 times that of said securing part.

18. A hollow fiber membrane module claimed in claim 1, wherein said spacer is disposed at a position whose distance from said securing part is about 1/5 to 1/10 of the length of said hollow fibers.

19. A hollow fiber membrane module claimed in claim 1, wherein free end portions of said U-shaped hollow fibers are distributed concentrically.

20. A hollow fiber membrane module claimed in claim 1, wherein free end portions of said U-shaped hollow fibers are distributed in the form of concentric arcs.

21. A hollow fiber membrane module claimed in claim 1, wherein said hollow fibers are made of a material selected from the group consisting of polyolefin, fluorinated polyolefin, polysulfone, and polyacrylonitride.

22. A hollow fiber membrane module claimed in claim 1, wherein said support member and said spacer respectively comprise a straight belt-shaped support member provided with a plurality of holes.

23. A hollow fiber membrane module claimed in claim 22, wherein said support members are provided with fiber shift preventing projections.

24. A hollow fiber membrane module claimed in claim 22, wherein the width of said belt-shaped support member of said spacer is smaller than that of said support member.

25. A hollow fiber membrane module claimed in claim 22, further comprising a water collecting pipe extending downwardly from said water collecting part, and support bars supporting said support member and said spacer on said water collecting part.

26. A hollow fiber membrane module claimed in claim 22, wherein said hollow fibers are made of a material selected from the group consisting of polyolefin, fluorinated polyolefin, polysulfone, and polyacrylonitride.

27. A hollow fiber membrane module claimed in claim 12, wherein the outer diameter of said spacer is about 1 to 2 times that of said securing part.

* * * * *